US009435483B1

(12) United States Patent
McDonald et al.

(10) Patent No.: US 9,435,483 B1
(45) Date of Patent: Sep. 6, 2016

(54) ARMS FOR A TREE

(71) Applicants: Brian McDonald, Cato, WI (US); Dana McDonald, Cato, WI (US)

(72) Inventors: Brian McDonald, Cato, WI (US); Dana McDonald, Cato, WI (US)

(*) Notice: Subject to any disclaimer, the term of this patent is extended or adjusted under 35 U.S.C. 154(b) by 0 days.

(21) Appl. No.: 14/929,695

(22) Filed: Nov. 2, 2015

(51) Int. Cl.
*A47B 96/06* (2006.01)
*F16M 13/02* (2006.01)
*F16B 7/00* (2006.01)

(52) U.S. Cl.
CPC ............... *F16M 13/02* (2013.01); *F16B 7/00* (2013.01)

(58) Field of Classification Search
CPC .................. F16M 13/02; F16B 7/00
See application file for complete search history.

(56) References Cited

U.S. PATENT DOCUMENTS

| 5,491,920 A * | 2/1996 | McCullers | F41A 23/00 42/94 |
| 2003/0038218 A1* | 2/2003 | Eppard | A01M 31/025 248/219.4 |

* cited by examiner

*Primary Examiner* — Amy Sterling
(74) *Attorney, Agent, or Firm* — Donald J. Ersler

(57) ABSTRACT

Arms for a tree preferably includes a right arm and a left arm. Each arm includes an upper arm, a forearm and a hand. One end of the forearm includes an upper arm counterbore and an opposing end includes a hand counterbore. A flat surface is formed on one end of the upper arm and an arm cylindrical projection extends from an opposing end of the upper arm. The hand includes a wrist, a hand portion, a plurality of fingers and a thumb. A hand cylindrical projection extends from one end of the wrist and the hand portion extends from an opposing end of the wrist. The plurality of fingers and thumb extend from the hand portion. A curved hand includes the fingers and thumb curved to provide an inner cylindrical shape. A straight hand includes the fingers and thumb extending outward from the wrist in a substantially horizontal.

14 Claims, 5 Drawing Sheets

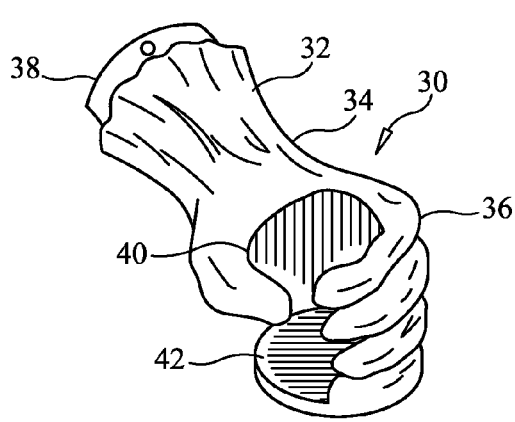
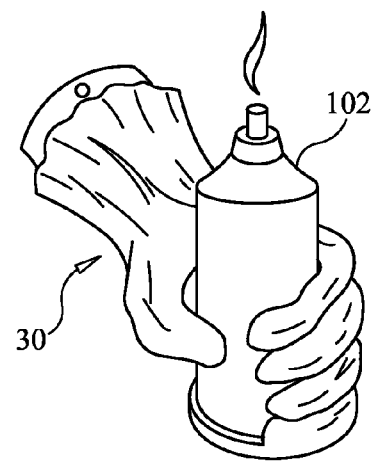
FIG. 5         FIG. 6
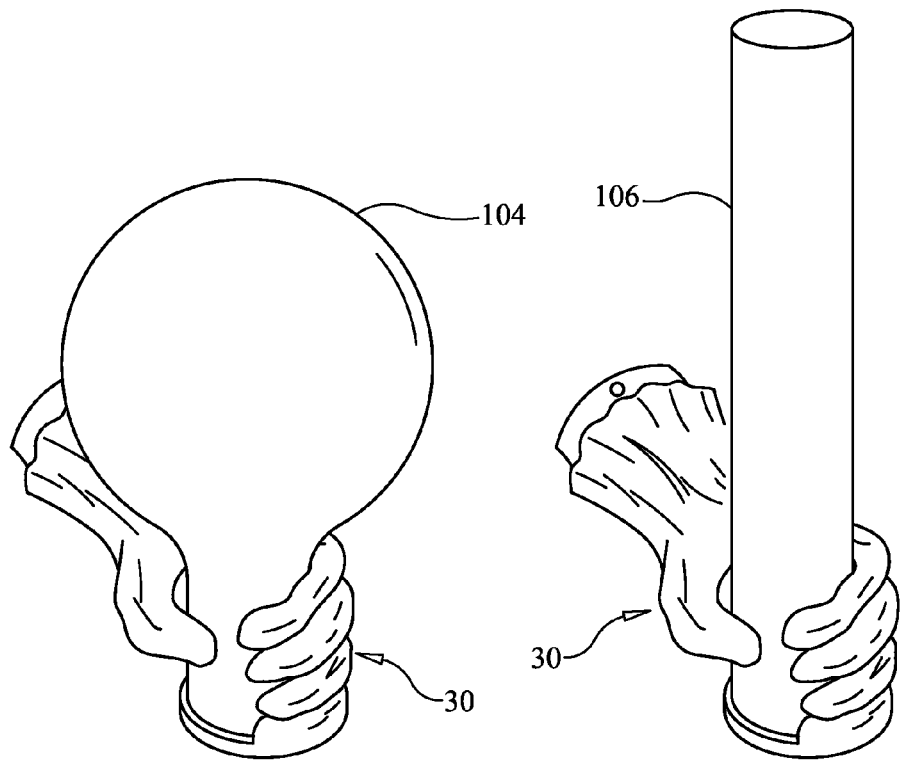
FIG. 7         FIG. 8

ARMS FOR A TREE

BACKGROUND OF THE INVENTION

1. Field of the Invention

The present invention relates generally to lawn and garden items and more specifically to arms for a tree, which provide a decorative object shaped as a human arm that is attached to a tree to hold lawn and garden items.

2. Discussion of the Prior Art

It appears that the prior art does not disclose a decorative object shaped as a human arm that is attached to a tree to hold outdoor lawn and garden items.

Accordingly, there is a clearly felt need in the art for arms for a tree, which provides a decorative object shaped as a human arm that is attached to a tree to hold lawn and garden items, such as bird houses, bird feeders, tiki torches, plants in potts, gazing globes, solar lights and the like.

SUMMARY OF THE INVENTION

The present invention provides arms for a tree, which provides a decorative object shaped as a human arm that is attached to a tree to hold lawn and garden items. The arms for a tree preferably includes a right arm and a left arm. Each arm includes an upper arm, a forearm and a hand. A shape of the upper arm, the forearm and the hand resemble a human arm and a hand, but has an outer surface, which has a wood like appearance. One end of the forearm preferably includes an upper arm counterbore and an opposing end includes a hand counterbore. A flat surface is formed on one end of the upper arm and an arm cylindrical projection extends from an opposing end of the upper arm. The hand preferably includes a wrist, a hand portion, a plurality of fingers and a thumb. A hand cylindrical projection extends from one end of the wrist and the hand portion extends from an opposing end of the wrist. The plurality of fingers and the thumb extend from the hand portion. A curved hand includes the fingers and thumb curved to provide a substantially inner cylindrical shape for retention of a tiki torch, a gazing globe, a cylindrical object or any other suitable item. A straight hand includes the fingers and thumb extending outward from the wrist in a substantially horizontal plane to retain a flower pot, a bird house or any other suitable item.

Accordingly, it is an object of the present invention to provide arms for a tree, which provides a decorative object shaped as a human arm that is attached to a tree to hold lawn and garden items, such as bird houses, bird feeders, tiki torches, plants in pots, gazing globes, solar lights and the like.

These and additional objects, advantages, features and benefits of the present invention will become apparent from the following specification.

BRIEF DESCRIPTION OF THE DRAWINGS

FIG. 5 is a perspective view of a curved hand of an arm for a tree in accordance with the present invention.

FIG. 6 is a perspective view of a curved hand of an arm for a tree retaining a tiki torch in accordance with the present invention.

FIG. 7 is a perspective view of a curved hand of an arm for a tree retaining a gazing globe in accordance with the present invention.

FIG. 8 is a perspective view of a curved hand of a tree with arms retaining a solar light in accordance with the present invention.

DETAILED DESCRIPTION OF THE PREFERRED EMBODIMENTS

Figure 1:
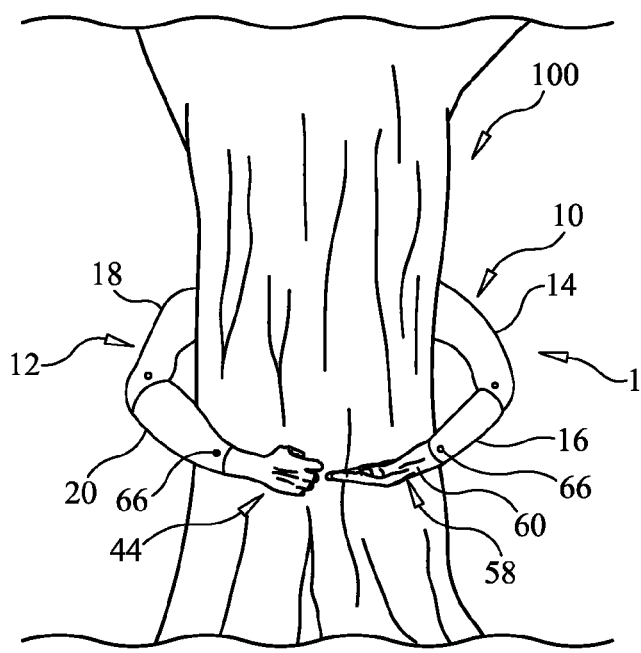
FIG. 1 is a front perspective view of a portion of a tree with arms for a tree attached to opposing sides thereof in accordance with the present invention.
Figure 2:
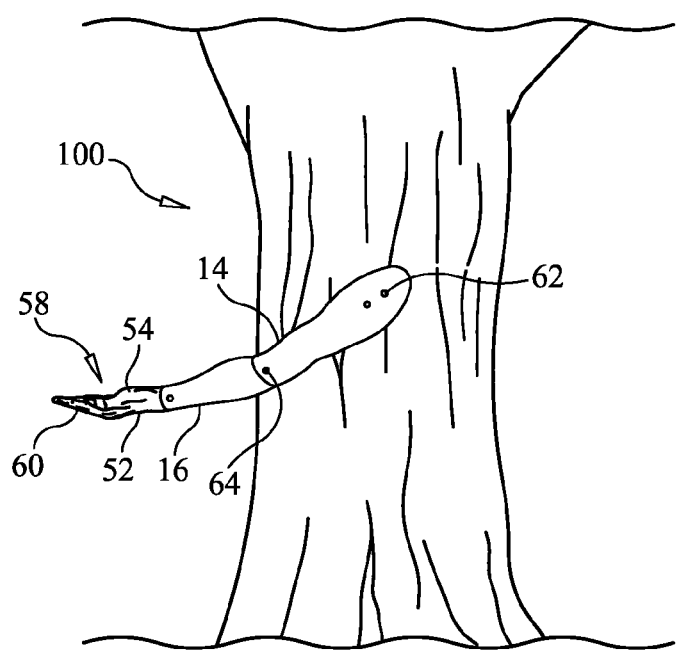
FIG. 2 is a right side view of a portion of a tree with an arm for a tree attached to one side in accordance with the present invention.
Figure 3:
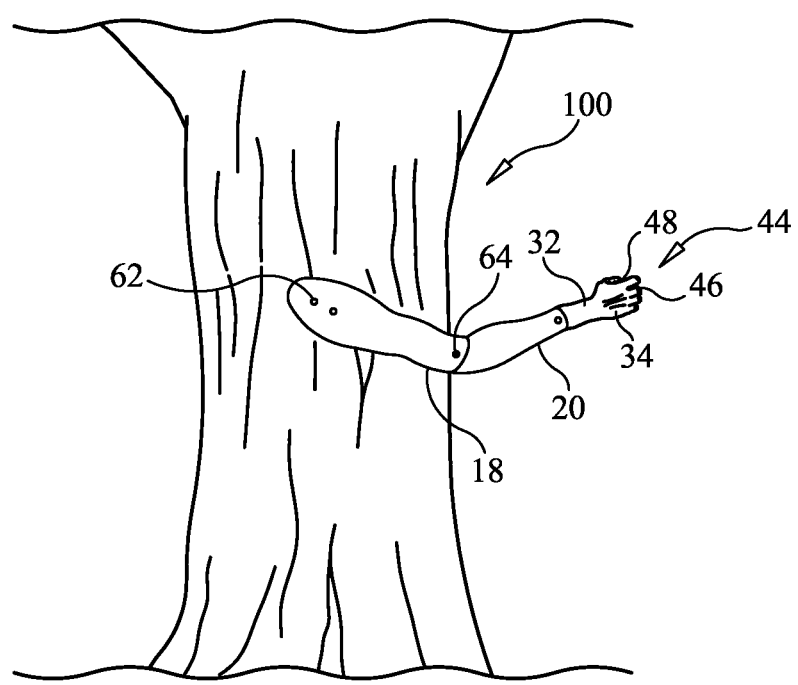
FIG. 3 is a left side view of a portion of a tree with an arm for a tree having attached to one side in accordance with the present invention.
Figure 4:
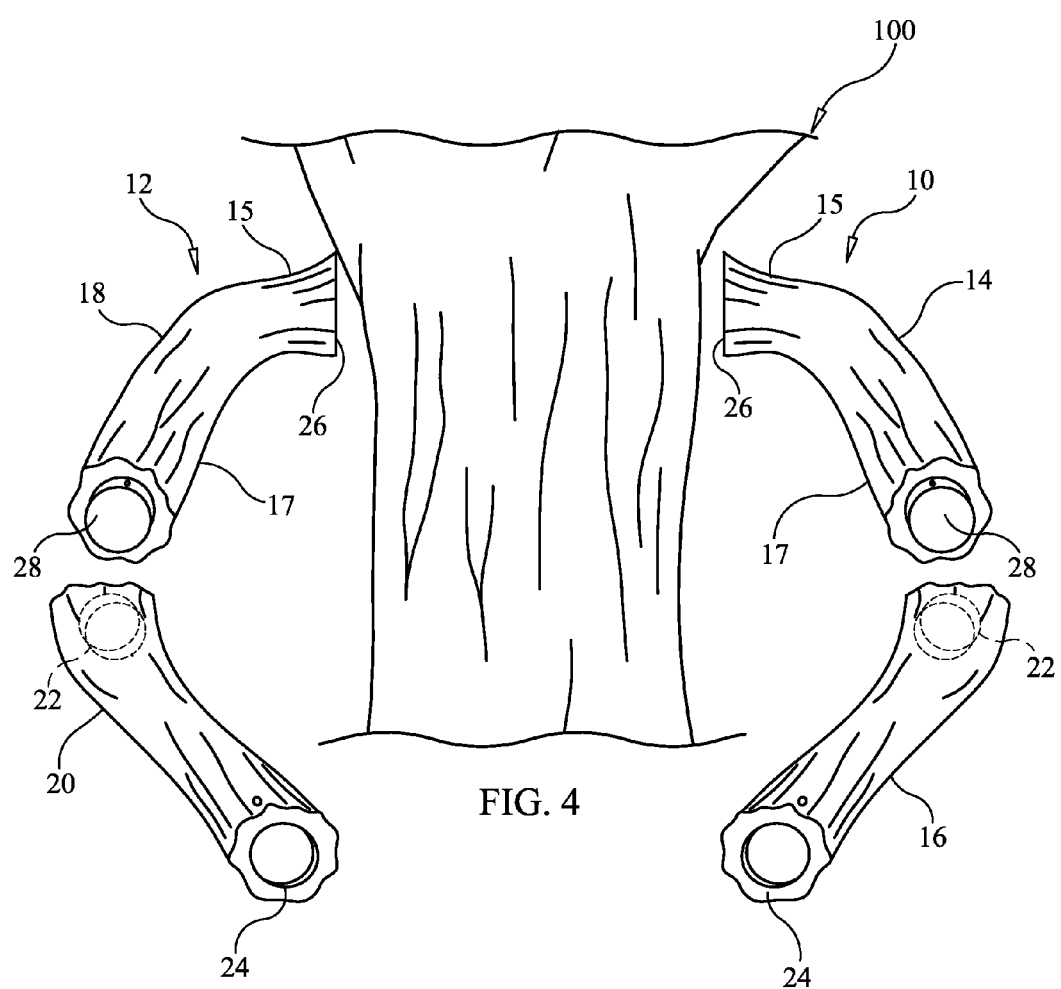
FIG. 4 is a front exploded perspective view of a portion of a tree and arms for a tree without hands in accordance with the present invention.

With reference now to the drawings, and particularly to FIG. 1, there is shown a perspective view of arms for a tree 1. With reference to FIGS. 2-4, the arms for a tree 1 preferably includes a right arm 10 and a left arm 12. The right arm 10 includes a right upper arm 14, a right forearm 16 and a right hand. The left arm 12 includes a left upper arm 18 and a left forearm 20 and a left hand. A shape of the upper arms 14, 18, the forearms 16, 20 and the hands resemble a human arm and hand, but have an outer surface which has a wood like appearance. One end of the forearms 16, 20 include an upper arm counterbore 22 and an opposing end includes a hand counterbore 24. A flat surface 26 is formed on one end of the upper arms 14, 18 and an arm cylindrical projection 28 extends from an opposing end of the upper arms 14, 18. The upper arms 14, 18 preferably include a substantial L-shape with a base portion 15 and a lengthwise portion 17. The lengthwise portion 17 extends from a side of the base portion 15.

With reference to FIG. 5, a curved right hand 30 preferably includes a wrist 32, a hand portion 34, a plurality of right fingers with thumb 36. A hand cylindrical projection 38 extends from one end of the wrist 32 and the hand portion 34 extends from an opposing end of the wrist 32. The hand cylindrical projection 38 is sized to be rotatably received by the hand counterbore 24. The plurality of right fingers and thumb 36 extend from the hand portion 34. An inner perimeter 40 of the plurality of right fingers and thumb 36 includes a substantially round shape. A support base 42 extends from a bottom of the lowest right finger. A curved left hand 44 includes the wrist 32, the hand portion 34, a plurality of left fingers with thumb 46. A hand cylindrical projection 38 (not shown) extends from one end of the wrist 32 and the hand portion 34 extends from an opposing end of the wrist 32. The plurality of left fingers with thumb 46 extend from the hand portion 34. An inner perimeter 48 of the plurality of right fingers and thumb 46 includes a substantially round shape. A support base 42 (not shown) extends from a bottom of the lowest left finger. With reference to FIGS. 6-8, the inner perimeters 40, 48 are capable of retaining a tiki torch 102, a gazing globe 104, a solar light 106 or any other suitable item.

Figure 9:
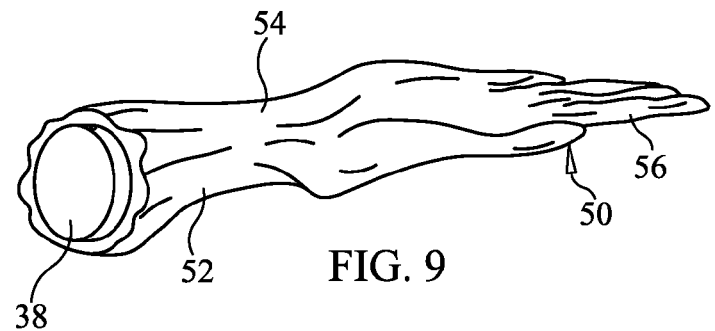
FIG. 9 is a perspective view of a straight hand of an arm for a tree in accordance with the present invention.
Figure 10:
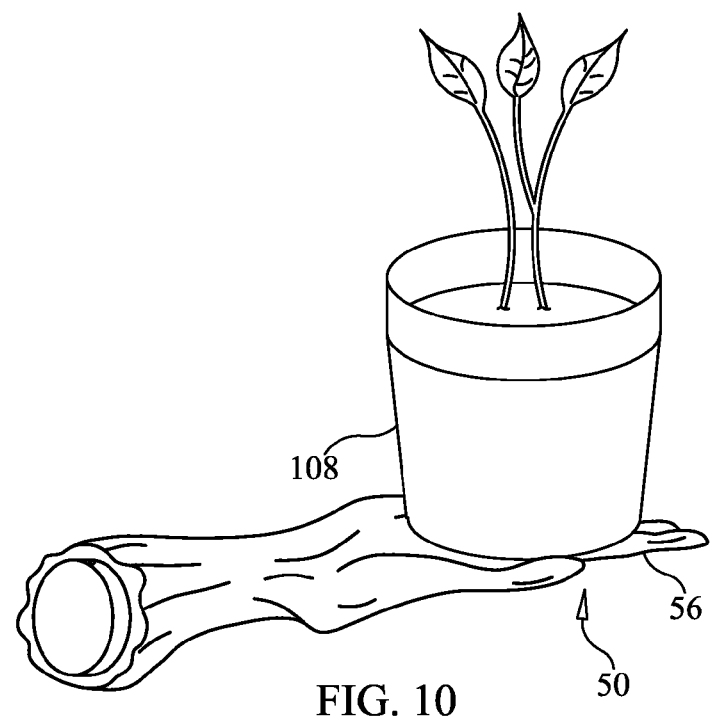
FIG. 10 is a perspective view of a straight hand of an arm for a tree retaining a flower pot in accordance with the present invention.
Figure 11:
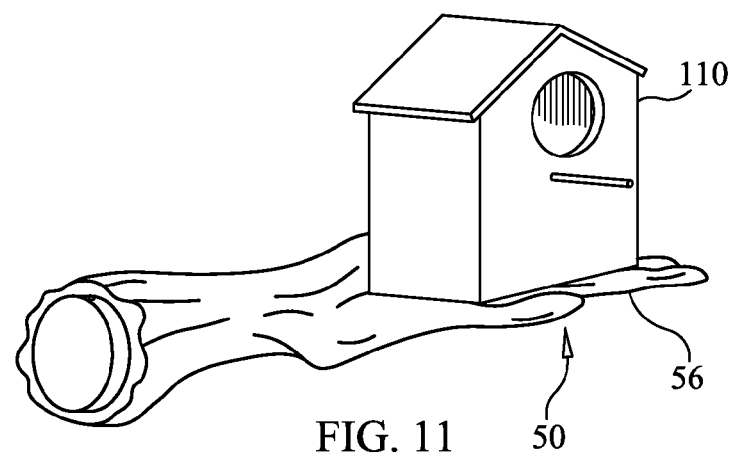
FIG. 11 is a perspective view of a straight hand of an arm for a tree retaining a bird house in accordance with the present invention.

With reference to FIG. 9, a straight left hand 50 includes a wrist 52, a hand portion 54, a plurality of left fingers with thumb 56. The hand cylindrical projection 38 extends from one end of the wrist 52 and the hand portion 54 extends from an opposing end of the wrist 52. The plurality of left fingers with thumb 56 extend from the hand portion 54. The plurality of left fingers with thumb 56 are substantially flat. A straight right hand 58 includes the wrist 52, the hand portion 54 and a plurality of right fingers with thumb 60. The plurality of right fingers with thumb 60 extend from the hand portion 54. The plurality of right fingers with thumb 60 are substantially flat. With reference to FIGS. 10-11, the left fingers and thumb 56 are capable of retaining a flower pot 108 and a bird house 110.

The arms for a tree 1 are preferably assembled in the following manner. The flat surfaces 26 of the upper arms 14, 18 are placed on opposing sides of a tree 100, angularly positioned and attached to the tree 100 with a plurality of fasteners 62. The arm cylindrical projections 28 of the upper arms 14, 18 are inserted into the upper arm counterbore 22 of the forearms 16, 20; the forearms 16, 20 are rotated relative to the upper arms 14, 18; and preferably secured with a plurality of fasteners 64, but other securement methods may also be used. The hand cylindrical projection 38 of the hands 30, 44, 50, 58 are inserted into the hand counterbores 24 of the forearms 16, 20; rotated relative to the forearms 16, 20 to provide the optimal support angle; and preferably secured with a plurality of fasteners 66, but other securement methods may also be used.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

We claim:

1. An arm for attachment to a tree comprising:
an upper arm includes a substantially flat surface formed on one end and an arm projection extends from an opposing end;
a forearm includes an upper arm cavity formed on one end and a hand cavity formed on an opposing end, said arm projection is retained in said upper arm cavity; and
a hand includes a wrist, at least three fingers and a thumb, a hand projection extends from one end of said wrist, said at least three fingers and a thumb extend from an opposing end of said wrist, said at least three fingers and thumb are curved toward each other such that an inside surface of said at least three fingers and thumb form a substantially cylindrical object cavity, a support base extends from a bottom of said at least three fingers and thumb, said support base provides support for an object placed inside said at least three fingers and thumb, said hand projection is retained in said hand cavity, wherein said substantially flat surface of said upper arm is capable of being attached to a tree.

2. The arm for attachment to a tree of claim 1 wherein:
said plurality of fingers are substantially flat.

3. The arm for attachment to a tree of claim 1 wherein:
said plurality of fingers are curved to have a substantially round inner perimeter, a support base extends from a bottom one of said plurality fingers.

4. The arm for attachment to a tree of claim 1 wherein:
a shape of said upper arm, said forearm and said hand have the appearance of a human arm and hand.

5. The arm for attachment to a tree of claim 1 wherein:
said upper arm, said forearm and said hand have an outer surface with the appearance of wood grain.

6. The arm for attachment to a tree of claim 1 wherein:
a thumb extends from said plurality of fingers.

7. The arm for attachment to a tree of claim 1 wherein:
said arm is formed as at least one of a right arm and a left arm.

8. An arm for attachment to a tree comprising:
an upper arm includes a substantially flat surface formed on one end and a cylindrical arm projection extends from an opposing end;
a forearm includes a cylindrical upper arm cavity formed on one end and a cylindrical hand cavity formed on an opposing end, said cylindrical arm projection is inserted into said cylindrical upper arm cavity and retained in said upper arm cavity with a first fastener; and
a hand includes a wrist, at least three fingers and a thumb, a cylindrical hand projection extends from one end of said wrist, said at least three fingers and a thumb fingers extend from an opposing end of said wrist, said at least three fingers and thumb are curved toward each other such that an inside surface of said at least three fingers and thumb form a substantially cylindrical object cavity, a support base extends from a bottom of said at least three fingers and thumb, said support base provides support for an object placed inside said at least three fingers and thumb, said cylindrical hand projection is inserted into said cylindrical hand cavity and retained in said cylindrical hand cavity with a second fastener, wherein said substantially flat surface of said upper arm is capable of being attached to a tree with at least one third fastener.

9. The arm for attachment to a tree of claim 8 wherein:
said plurality of fingers are substantially flat.

10. The arm for attachment to a tree of claim 8 wherein:
said plurality of fingers are curved to have a substantially round inner perimeter, a support base extends from a bottom one of said plurality fingers.

11. The arm for attachment to a tree of claim 8 wherein:
a shape of said upper arm, said forearm and said hand have the appearance of a human arm and hand.

12. The arm for attachment to a tree of claim 8 wherein:
said upper arm, said forearm and said hand have an outer surface with the appearance of wood grain.

13. The arm for attachment to a tree of claim 8 wherein:
a thumb extends from said plurality of fingers.

14. The arm for attachment to a tree of claim 8 wherein:
said arm is formed as at least one of a right arm and a left arm.

* * * * *